(12) United States Patent
Ignat et al.

(10) Patent No.: US 6,611,838 B1
(45) Date of Patent: Aug. 26, 2003

(54) METADATA EXCHANGE

(75) Inventors: Liviu Ignat, Nepean (CA); Henk Cazemier, Nepean (CA)

(73) Assignee: Cognos Incorporated, Ottawa (CA)

( * ) Notice: Subject to any disclaimer, the term of this patent is extended or adjusted under 35 U.S.C. 154(b) by 202 days.

(21) Appl. No.: 09/654,015

(22) Filed: Sep. 1, 2000

(51) Int. Cl.[7] .............................................. G06F 17/30
(52) U.S. Cl. ....................................................... 707/101
(58) Field of Search ........................... 707/1, 2, 10, 100, 707/102, 103 R, 101; 341/51; 705/1; 709/201, 203, 217, 219; 717/104

(56) References Cited

U.S. PATENT DOCUMENTS

| | | | |
|---|---|---|---|
| 5,555,403 A | | 9/1996 | Cambot et al. ................. 707/4 |
| 5,915,257 A | | 6/1999 | Gartung et al. ............. 707/503 |
| 6,263,313 B1 | * | 7/2001 | Milsted et al. ................. 341/51 |
| 6,317,749 B1 | * | 11/2001 | Ghatate ...................... 707/100 |
| 6,336,137 B1 | * | 1/2002 | Lee et al. .................... 709/219 |
| 6,418,428 B1 | * | 7/2002 | Bosch et al. .................... 707/2 |
| 6,418,448 B1 | * | 7/2002 | Sarkar ............................ 707/1 |

OTHER PUBLICATIONS

Article in the Electrical Engineering Handbook, CRC Press LLC 1999, entitled "Knowledge Engineering", by M. Abdelguerfi and R. Eskicioglu.
Cognos Impromptu, Administrator's Guide, entitled Cognos Enterprise Business Intelligence, published in 1998.

* cited by examiner

Primary Examiner—Diane D. Mizrahi
Assistant Examiner—Apu M Mofiz
(74) Attorney, Agent, or Firm—Gardner Groff, P.C.

(57) ABSTRACT

Metadata exchanging for importing metadata from one or more external sources of metadata into a metadata model is described. A metadata extracted from an external source is in a source format specific to the external source. The metadata model uses a model format. The metadata exchange translates the metadata in the source format into one or more model objects in the model format, and then import the model objects into the metadata model.

43 Claims, 8 Drawing Sheets

METADATA EXCHANGE

FIELD OF THE INVENTION

The present invention relates generally to a metadata exchange, and more particularly to a metadata exchange which is suitably used to build a metadata model for a reporting system that accesses a plurality of data stores including relational databases.

BACKGROUND OF THE INVENTION

It is known to use data processing techniques to design information systems for storing and retrieving data. Data is any information, generally represented in binary, that a computer receives, processes, or outputs. A database or data warehouse is a shared pool of interrelated data. Information systems are used to store, manipulate and retrieve data from databases.

Traditionally, file processing systems were often used as information systems. File processing systems usually consist of a set of files and a collection of application programs. Permanent records are stored in the files, and application programs are used to update and query the files. Such application programs are generally developed individually to meet the needs of different groups of users. Information systems using file processing techniques have a number of disadvantages. Data is often duplicated among the files of different users. The lack of coordination between files belonging to different users often leads to a lack of data consistency. Changes to the underlying data requirements usually necessitate major changes to existing application programs. There is a lack of data sharing, reduced programming productivity, and increased program maintenance. File processing techniques, due to their inherent difficulties and lack of flexibility, have lost a great deal of their popularity and are being replaced by database management systems (DBMSs).

A DBMS is a software system for assisting users to create reports from data stores by allowing for the definition, construction, and manipulation of a database. The main purpose of a DBMS system is to provide data independence, i.e., user requests are made at a logical level without any need for knowledge as to how the data is stored in actual files in the database. Data independence implies that the internal file structure could be modified without any change to the users' perception of the database. However, existing DBMSs are not successful in providing data independence, and requires users to have knowledge of physical data structures, such as tables, in the database.

To achieve better data independence, it is proposed to use three levels of database abstraction in "The Electrical Engineering Handbook" Richard C. Dorf, CRCnetBASE 1999, section 94.1. With respect to the three levels of database abstraction, reference is made to FIG. 1.

The lowest level in the database abstraction is the internal level 1. In the internal level 1, the database is viewed as a collection of files organized according to an internal data organization. The internal data organization may be any one of several possible internal data organizations, such as $B^+$-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the DBMS. When the data structure or file organization of the database is changed, the internal level 1 is also changed. When changes to the internal level 1 do not affect the conceptual level 2 and external level 3, the DBMS is said to provide for physical data independence. When changes to the conceptual level 2 do not affect the external level 3, the DBMS is said to provide for logical data independence.

Typical DBMSs use a data model to describe the data and its structure, data relationships, and data constraints in the database. Some data models provide a set of operators that are used to update and query the database. DBMSs may be classified as either record based systems or object based systems. Both types of DBMSs use a data model to describe databases at the conceptual level 2 and external level 3.

Data models may also be called metadata models as they store metadata, i.e., data about data in databases.

Three main existing data models used in record based systems are the relational model, the network model and the hierarchical model.

In the relational model, data is represented as a collection of relations. To a large extent, each relation can be thought of as a table. A typical relational database contains catalogues, each catalogue contains schemas, and each schema contain tables, views, stored procedures and synonyms. Each table has columns, keys and indexes. A key is a set of columns whose composite value is distinct for all rows. No proper subset of the key is allowed to have this property. A table may have several possible keys. Data at the conceptual level 2 is represented as a collection of interrelated tables. The tables are normalized so as to minimize data redundancy and update anomalies. The relational model is a logical data structure based on a set of tables having common keys that allow the relationships between data items to be defined without considering the physical database organization.

A known high level conceptual data model is the Entity-Relationship (ER) model. In an ER model, data is described as entities, attributes and relationships. An entity is anything about which data can be stored. Each entity has a set of properties, called attributes, that describe the entity. A relationship is an association between entities. For example, a professor entity may be described by its name, age, and salary and can be associated with a department entity by the relationship "works for".

Existing information systems use business intelligence tools or client applications that provide data warehousing and business decision making and data analysis support services using a data model. In a typical information system, a business intelligence tool is conceptually provided on the top of a data model, and underneath of the data model is a database. The data model of existing information systems typically has layers corresponding to the external level 3 and the internal level 1. Some data models may use a layer corresponding to both the external level 3 and the conceptual level 2.

Existing data models are used for the conceptual design of databases. When a system designer constructs an information system, the designer starts from a higher abstraction level 3 and moves down to a lower abstraction level 1, as symbolized in FIG. 1 by arrows.

That is, the system designer first performs logical design. At the logical design stage, the designer considers entities of interest to the system users and identifies at an abstract level information to be recorded about entities. The designer then determines conceptual scheme, i.e., the external level 3 and/or conceptual level 2 of a data model. After the logical design is completed, the designer next performs physical design. At the physical design stage, the designer decides how the data is to be represented in a database. The designer then creates the corresponding storage scheme, i.e., the structure of a database, and provides mapping between the internal level 1 of the data model and the database.

Existing business intelligence tools thus each provides a different paradigm for retrieving and delivering information from a database. Accordingly, it is difficult to share information in the database among different business intelligence tools.

It is common that in a single organization, each group of users has its own established information system that uses its corresponding database. Thus, the single organization often has multiple databases. Those databases often contain certain types of information which are useful for multiple groups of users. Such types of information may include information about business concepts, data retrieval, and user limits and privileges. However, each information system was designed and constructed in accordance with specific needs of the group, and may use a different business intelligence tool from others. These differences in the information systems and business intelligence tools used do not allow sharing the information already existing in the databases among multiple groups of users.

Accordingly, it is desirable to provide a metadata model which provide information that can be shared by multiple users who use those different business intelligence tools or client applications. In order to build such a metadata model, it is desirable to provide a tool which can extract metadata from different types of databases or other sources of metadata.

SUMMARY OF THE INVENTION

The present invention is directed to a metadata exchange for importing metadata from one or more external sources of metadata into a metadata model. A metadata extracted from an external source is in a source format specific to the external source. The metadata model uses a model format. The metadata exchange translates the metadata in the source format into one or more model objects in the model format, and then import the model objects into the metadata model.

According to one aspect of the present invention, there is provided a metadata exchange for importing metadata from an external source of metadata which uses a source format into a metadata model which uses a model format. The metadata exchange comprises a source access module and a metadata module. The source access module is provided for communicating with the external source of metadata to extract metadata in the source format. The metadata module is provided for translating the extracted metadata in the source format into one or more model objects in the model format, and importing the model objects in the model format into the metadata model.

According to another aspect of the present invention, there is provided a method for importing metadata from an external source of metadata which uses a source format into a metadata model which uses a model format. The method comprises communicating with the external source of metadata to extract metadata in the source format; translating the extracted metadata in the source format into one or more model objects in the model format; and importing the model object into the metadata model.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which.

DETAILED DESCRIPTION OF EMBODIMENTS OF THE INVENTION

Figure 2:
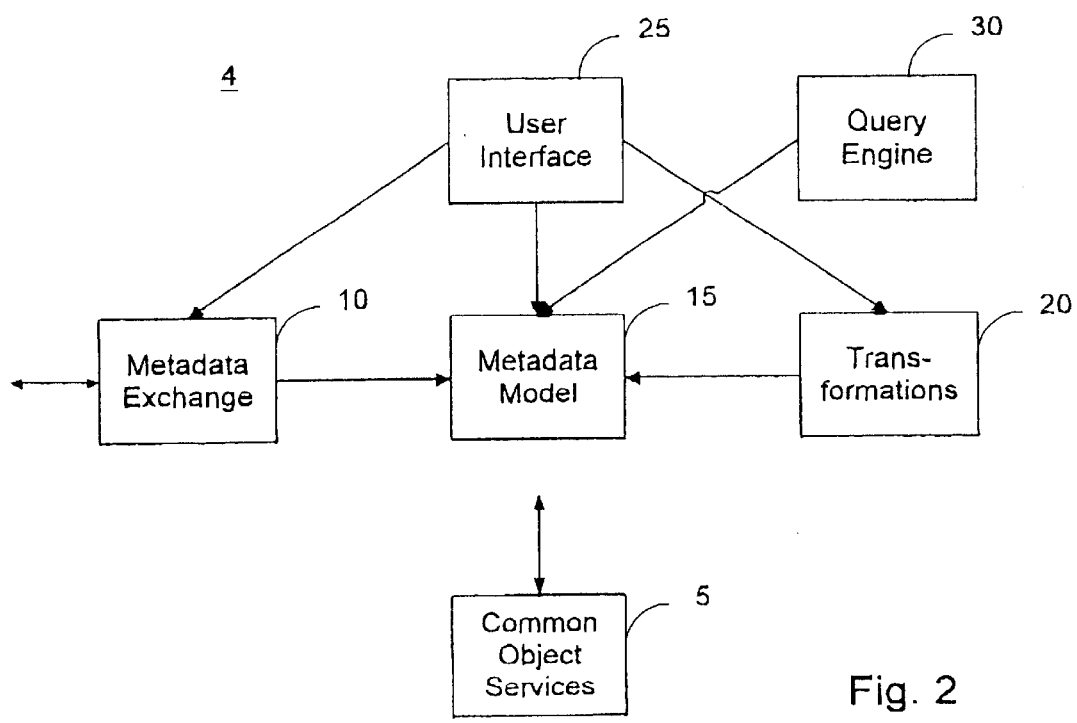
FIG. 2 is a diagram showing an example of a reporting system to which an embodiment of the present invention is applied.

FIG. 2 illustrates a reporting system 4 to which an embodiment of the present invention is suitably applied. The reporting system 4 provides a single administration point for metadata that supports different business intelligence tools or client applications. Thus, it enables different business intelligence tools to extract and interpret data from various data sources in the same way.

The reporting system 4 includes common object services (COS) 5, a metadata exchange 10, a metadata model 15, a metadata model transformer or transformations 20, a user interface 25 and a query engine 30. The fundamental objective of the reporting system 4 is to provide a rich business-oriented metadata model 15 that allows the query engine 30 to generate the best queries of which it is capable, and allows users to build queries, reports and cubes with the aid of the query engine 30 to obtain desired reports from underlying data sources. To this end, COS 5, metadata exchange 10 and transformations 20 are provided.

Prior to describing the metadata model 15 and the transformations 20 in detail, each element of the reporting system 4 is briefly described.

COS 5 defines the framework for object persistence. Object persistence is the storage, administration and management of objects on a physical device and transfer of those objects to and from memory as well as the management of those objects on the physical device. The double head arrow from COS 5 in FIG. 2 represents that COS 5 communicates with all other elements shown in FIG. 2. COS 5 performs functions such as creating new objects, storing them on disk, deleting them, copying them, moving them, handling change isolation (check-in, check-out) and object modelling. COS 5 uses a modelling language, such as Comet Modelling Language (CML) that generates C++ code.

Figure 2A:
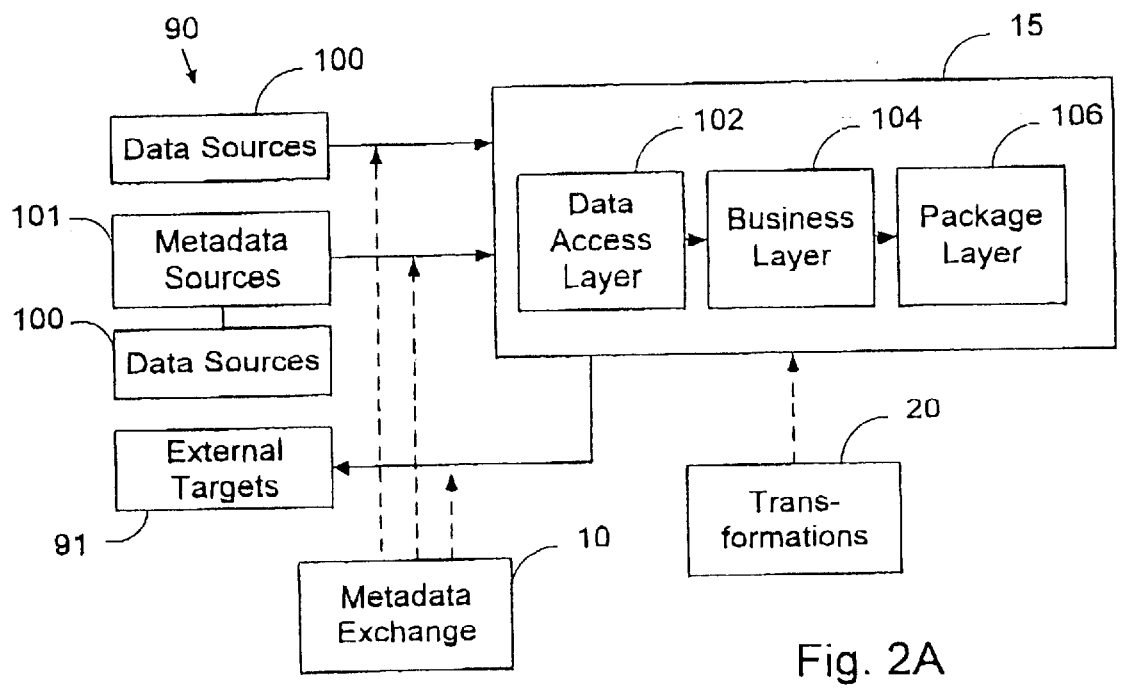
FIG. 2A is a diagram showing functions of the metadata exchange, metadata model and transformations shown in FIG. 2.

The metadata exchange 10 is used to obtain metadata from external physical sources. Metadata is obtained from one or more external sources of metadata. As shown in FIG. 2A, external sources of metadata may be one or more data sources 100 and/or one or more metadata sources 101. Data sources 100 contain physical data. Examples of data sources 100 include databases and files. Metadata sources 101 contain descriptive information about data sources. Metadata sources 101 are also known as metadata repositories. Metadata repositories may be third party repositories. Metadata sources 101 generally have underlying data sources 100 containing physical data. The metadata exchange 10 facilitates importation of metadata from external sources 100 and 101 into the metadata model 15. Also, the metadata exchange 10 may facilitates exportation of metadata from the metadata model 15 to external metadata repositories.

Figure 1:
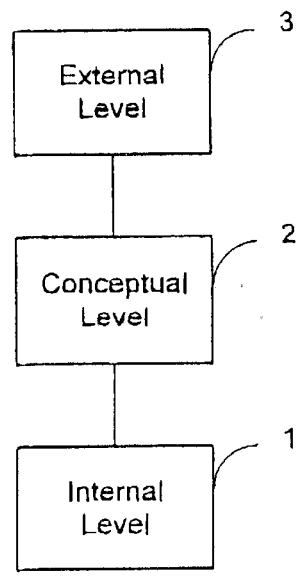
FIG. 1 is a diagram showing an example of database abstractions.

The metadata model 15 stores metadata about its underlying one or more data sources 100. It is used to provide a common set of business-oriented abstractions of the underlying data sources 100. The metadata model 15 defines the objects that are needed to define client applications that users build. The metadata model 15 provides three layers to realize three levels of abstractions of data sources 100 as described above referring to FIG. 1. The three layers are a physical layer or data access layer 102, a business layer 104 and a presentation layer or package layer 106.

Transformations 20 are used to complete the metadata model 15. For example, when a database is introduced to the reporting system 4, metadata is imported from the database into the metadata model 15. Metadata may also be imported from one or more metadata repositories or other data sources. Sufficient metadata may be imported from a database that would build only a small number of the objects that would actually be needed to execute queries. However, if such metadata does not have good mapping to the metadata model 15, then the transformations 20 can be used to provide the missing pieces to complete the metadata model 15.

The user interface 25 is layered on top of the metadata model 15 as a basic maintenance facility. The user interface 25 provides users with the ability to browse through the metadata model 15 and manipulate the objects defined thereby. The user interface 25 is also a point of control for the metadata exchange 10, for executing transformations 20, and for handling check-in, check-out of model objects, i.e., changed information, as well as a variety of other administrative operation. The user interface 25 allows users for the performance of basic maintenance tasks on the objects in the metadata model 15, e.g., changing a name, descriptive text, or data type. The user interface 25 is a mechanism that involves the capabilities of the metadata exchange 10 and the transformations 20. The user interface 25 has the ability to diagram the metadata model 15, so that the user can see how objects are related.

The query engine 30 is responsible for taking the metadata model 15 and a user's request for information, and generating a query that can be executed against the underlining data sources, e.g., a relational database. The query engine 30 is basically the reason for the existence of the rest of the blocks. The objective of the query engine 30 is to function as efficiently as possible and to preserve the semantics of the original question. A user may ask a question that is not precise. The request may be for something from "customers" and something from "products". But these may be related in multiple ways. The query engine 30 needs to figure out which relationship is used to relate "customers" and "products" to provide the user with information requested.

Figure 3:
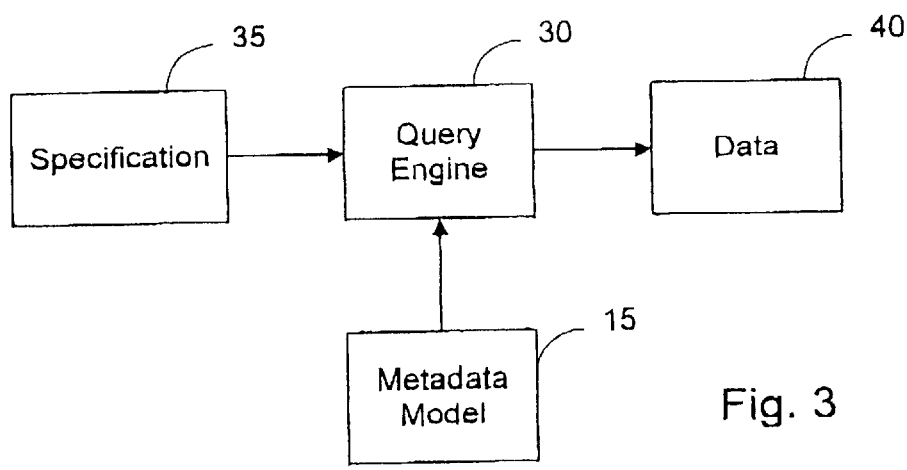
FIG. 3 is a diagram showing an example of a query engine that uses the metadata model shown in FIG. 2.

The use of the metadata model 15 by the query engine 30 is briefly described with reference to FIG. 3. A user uses a business intelligent tool or client application (not shown) to generate a user's request for information. Upon the receipt of the user's request, the client application generates an initial specification 35 based on the request. The specification 35 may be ambiguous. Also, it in not in a form that can be applied to the data sources directly. Using the information that is built in the metadata model 15, the query engine 30 makes the specification 35 unambiguous and builds a query in terms of the data access layer 102 for the specification 35. This intermediate formulation of the query is also called a physical query and is subsequently translated into a data source specification language. The data source specification language may be Structured Query Language (SQL). A query in a data source specification language can be executed on the data sources. Thus, the correct data 40 may be obtained.

Metadata Model 15

The metadata model 15 is a tool to supply the common metadata administration tool, unified and centralized modelling environment, and application program interfaces for business intelligence tools. The architecture of the metadata model 15 will now be described in further detail.

Metadata contained in the metadata model 15 is also called model objects. The metadata model 15 is organized as a single containment tree or a series of containment trees. A containment tree starts at the highest level with a model object. The model object itself is at the root of the tool, and all other objects, except the relationship objects, are contained within this root object.

Figure 2B:
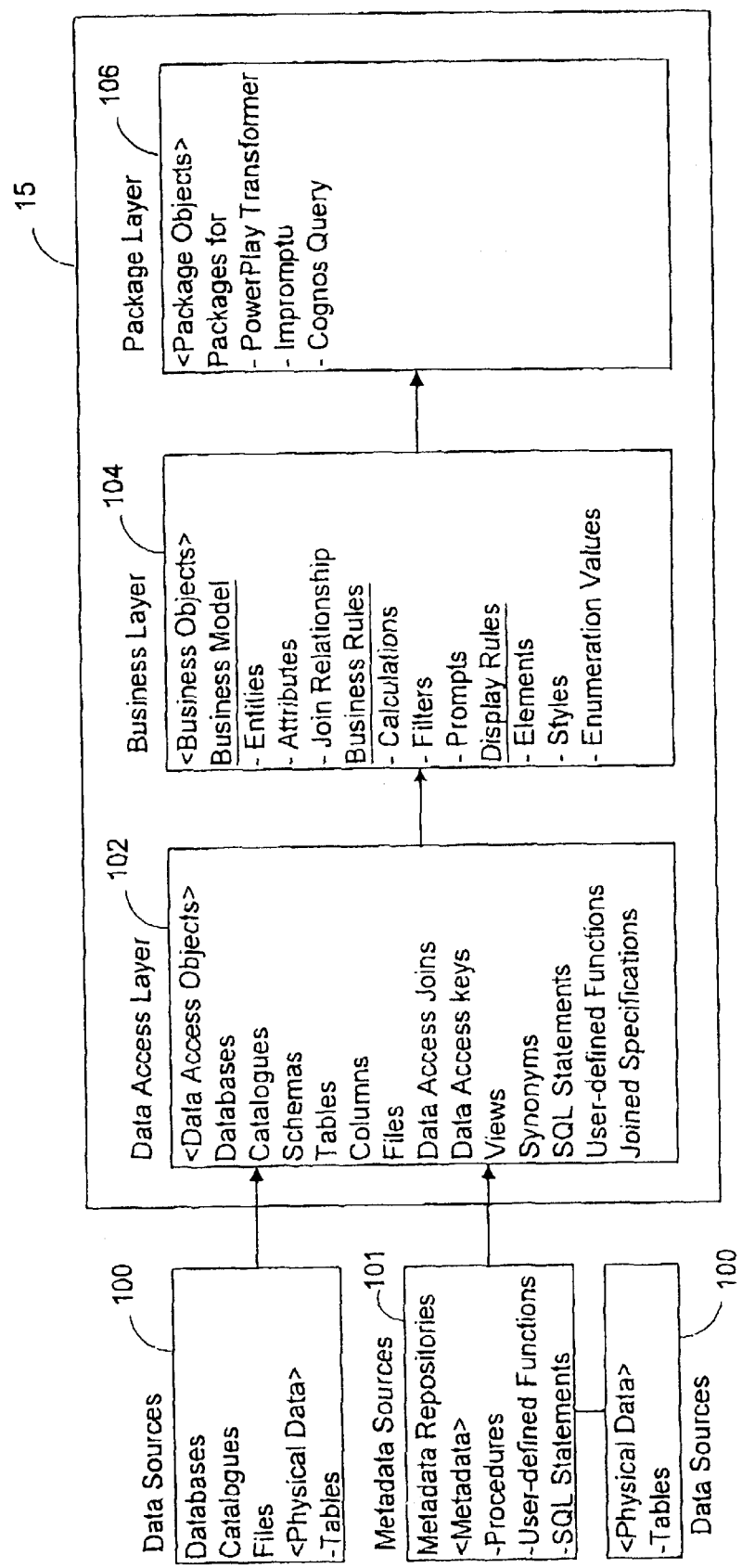
FIG. 2B is a diagram showing examples of objects contained in the metadata model shown in FIG. 2.

FIG. 2B shows the architecture of the metadata model 15. The metadata model 15 is composed of several layers, namely, a physical layer or data access layer 102, a business layer 104 and a presentation layer or package layer 106. These layers correspond to those abstraction levels shown in FIG. 1.

The model objects contained in a higher abstraction layer may include objects which are constructed from a lower abstraction layer to the higher abstraction layer The data access layer 102 contains metadata that describes how to retrieve physical data from data sources 100. It is used to formulate and refine queries against the underlying data sources 100. The underlying data sources 100 may be a single or multiple data sources, as described above. Examples of data sources 100 include relational databases, such as Oracle, Sybase, DB2, SQL Server and Informix.

The data access layer 102 contains a part of the model objects that directly describe actual physical data in the data sources 100 and their relationships. These model objects may be called data access model objects. The data access model objects may include, among other things, databases, catalogues, schemas, tables, files, columns, data access keys, indexes and data access joins. Each table has one or more columns. Data access joins exist between tables. A data access key corresponds to a key in the data sources 100 that references one or more column names whose composite value is distinct for all rows in a table. A data access join is a relationship between two or more tables or files. Also, the data access model objects may include views, function stored procedures and synonyms, if applicable.

The data access model objects in the data access layer 102 are metadata, which are created as a result of importing metadata from data sources 100 and metadata sources 101 provided by users. Examples of metadata sources 101 include Impromptu Catalogue and Impromptu Web Query 2.12. The information of some data access objects may be available from the underlying data sources 100. Information for join relationships are not available from the underlying data sources 100. The user can customize some objects in the data access layer 102 in order to create data access joins, i.e., relationships between objects that were imported from various data sources. Also, the transformations 20 may transform the data access layer 102 to complete it.

Also, the data access layer 102 may allow users to define therein data source queries, such as SQL queries. Data source queries return a result set of physical data from underlying data sources 100. Those created data source queries are treated as objects in the data access layer 102 like tables. After data source queries are defined, a set of columns objects is generated for each data source query by the query engine 30 based on the SQL statement. Users may also define stored procedures and/or overloaded stored procedures, rather than importing them from metadata sources 101.

The business layer 104 describes the business view of the physical data in the underlying data sources 100. It is used to provide business abstractions of the physical data with which the query engine 30 can formulate queries against the underlying data sources 100.

The business layer 104 contains a part of the model objects that can be used to define in abstract terms the user's business entities and their inter relationships. These model objects may be called business model objects. The business model objects are reusable objects that represent the concepts and structure of the business to be used in business intelligence environments. They represent a single business model, although they can be related to physical data in a number of different data sources 100.

The business model objects consist of a business model, business rules and display rules. The business model may include entities, attributes, keys and joins. Joins may be also called join relationships. The user interface 25 can provide a view of the business model as an entity-relationship diagram. The business rules may include calculations, filters and prompts. The display rules may include elements, styles and enumeration values.

The business model objects are closely related to the data access model objects in the data access layer 102. For example, entities in the business layer 104 are related to tables in the data access layer 102 indirectly; and attributes in the business layer 104 correspond to columns in the data access layer 102. Business joins exist between entities. Each business model object has a partner in the data access layer 102, i.e., a relationship exists between a table and an entity. While the tables in the data sources 100 store data access layer objects in accordance with the design of its underlying data sources 100, the entities in the business layer 104 hold the metadata representing the business concept. Entities are collections of attributes.

Attributes of entities in the business layer 104 contain expressions related to columns of tables in the data access layer 102. An attribute is usually directly related to a single column of the data access layer 102. For example, the entity "customer" could have attributes "customer name", "customer address", and the like. In the simplest case, all the attributes of an entity in the business layer 104 are related one-to-one to the columns of a single table in the data access layer 102. However, the relationship is not always a one-to-one relationship. Also, an attribute may be expressed as a calculation based on other attributes, constants and columns. For example, an attribute may be a summary of data in other attributes, e.g., a total amount of all the orders placed by customer.

In the business layer 104, entities are related to other entities by joins. Joins are classified as one of containment, reference or association. A containment join represents a strong relationship between entities. For example, an entity OrderDetail would have no meaning without an entity OrderHeader. Thus, the entity OrderDetail is containment of the entity OrderHeader.

A reference join indicates that one entity acts as a lookup table with respect to the other. For example, OrderDetail and Products are related via a relationship. In this case, Products acts as a lookup table so the relationship is marked as a reference relationship.

An association join represents relationships between entities which are not categorised as containment or reference joins.

It is advantageous to categorize the joins into these three types because they should be treated differently when query paths are considered. For example, a reference join should not be taken as a query path because if multiple entities reference to an entity, the referenced entity could incorrectly relate the unrelated multiple entities to each other by a query path through the referenced entity. By identifying reference joins as such, query paths can easily avoid these joins.

In addition, an entity may inherit information from another entity using a technique called subtyping. A subtype entity may be specialization of its supertype entity. For example, an entity Employee is a supertype entity for a subtype entity Salesman. Generally, a subtype entity has more attributes than its supertype. In the above example, the entity Employee may have attributes EmployeeNumber, Name, and Salary; and the entity Salesman may have attributes Quota, Sales and Commission in addition to EmployeeNumber, Name, and Salary.

Entities and attributes in the business layer 104 are given user friendly meaningful names. For example, the column named CUSTNAM from the CUST table in the data access layer 102 could be mapped to Customer Name attribute contained in the Customer Entity in the business layer 104.

The ways of use of entity relationships in the metadata model 15 are different from those in conventional modelling tools. For example, in most Entity-Relationship (ER) modelling tools, the ER concept is used to provide an abstraction for defining a physical database, i.e., it is a different "view" of the physical database. Within the metadata model 15, the business layer 104 is used to provide an abstraction for reporting data from physical data sources 100.

The information of the objects of the business model in the business layer 104 is not generally available in underlying data sources 100. Usually available information in metadata sources 101 is associated with the data access layer 102, rather than the business layer 104. One thing that may be available in external metadata repositories 101 is the business names for objects in the metadata model 15. However, again these business names tend to be provided for the physical tables and columns. If they can be mapped to the appropriate business entity or attribute, they may be used.

The business rules are used to develop business intelligence applications. Calculations use a combination of attributes and expression components, and make them available to report so that the up-to-date and consistent definitions are used to execute reports.

Filters and prompts are used to restrict queries. Applying a filter to an entity or attribute limits the scope of data retrieval for all users who work with this entity or attribute. Applying a filter to an entity or attribute in conjunction with a user class limits the scope of data retrieval for the user class. Elements and styles are used to associate presentation information with an attribute.

The package layer 106 contains a part of the model objects that describe subsets of the business layer 104. These model objects may be called package model objects. These are used to provide an organized view of the information in the business layer 104. The information is organized in terms of business subject areas or by way in which it is used.

The package model objects in the package layer 106 include presentation folders and/or subjects. Each subject in the package layer 106 contains references to a subset of the business model objects that are interested in a particular group or class of users. The subset of the business model objects are reorganized so that they can be presented to the group of users in a way suitable to the group of users. Also, a user can combine references to the business model objects available from the business layer 104 into combinations that are frequently used in the user's business. User defined folders that contain these combinations of references are called user folders or presentation folders.

Presentation folders and subjects contain references to objects in the business layer 104, including entities, attributes, filters and prompts. Presentation folders create packages of information for the end user. Each package is defined for a specific purpose, e.g., one or more business intelligence applications. Designers can combine them, by functions of subjects or by group of users, in order to organize business model objects into collections of most frequently used objects, or in order to support various business intelligent tools or client applications using the reporting system 4 of the present invention as a metadata provider.

The information of the objects in the package layer 106 is not generally available in external data sources 100. The concept of organized business subject areas may exist in external metadata repositories 101. The metadata model 15 may use such a concept in the business layer or data access layer.

For all objects in the data access layer 102 and the business layer 104, business descriptive metadata may also be included. Business descriptive metadata is used to help understand the source and the meaning of the data which is being manipulated. Business descriptive metadata may include lineage, accuracy, description and refresh rules. Lineage is a history of source and processing steps used to produce data set. Refresh is update rules for refreshing aggregated or submitted data for reporting. Business descriptive metadata is used by an end user and an application designer to understand the source of the information. Business descriptive metadata includes such things as descriptions and stewards. A steward is a person or group that manages the development, approval, creation, and use of data within a specified functional area. Business descriptive metadata may also include information that can be used to relate the objects to information in external repositories 101.

Business descriptive metadata may exist in many forms in external repositories 101. General purpose repositories and business information directories collect this information as that is their raison d'etre. Warehouse Extract-Transform-Load (ETL) tools collect this information as a result of collecting the ETL specifications. The information may be duplicated or collected from a variety of sources in the metadata model 15 so that it is available directly to the user as metadata. The metadata model 15 may also include context information which can be used to retrieve information from external repositories 101.

Most objects in the metadata model 15 may be organized in a tree. Some objects model relationships between other objects. As described above, each business model object in the business layer 104 has a partner in the data access layer 102. This relationship provides the context for processing all the related information of the tables in the data access layer 102. For example, if a particular column has not been processed, transformations 20 process the column in the context of a parent relationship, i.e., build an attribute and put under the entity.

The metadata model 15 may be built using CML files. CML files are compiled into C++ code which is then compiled in the reporting system 4 to build the metadata model 15.

Metadata Exchange 10

The metadata exchange 10 imports metadata into the metadata model 15 from one or more external sources 90 of metadata, such as data sources 100 and metadata sources 101. Depending on the nature of the source data, the metadata exchange 10 may import metadata into the data access layer 102, business layer 104 or package layer 106 in the metadata model 15. The objects imported into the data access layer 102 may be transformed into objects in the business layer 104, and the objects in the business layer 104 may be transformed into objects in the package layer 106.

Metadata in an external source 90 is metadata in a format specific to the external source 90. In order to import metadata from an external source 90 into the metadata model 15, the metadata exchange 10 extracts metadata from the external source 90, and translates the extracted metadata into metadata in a model format used in the metadata model 15. The metadata in the model format is a set of model objects. Thus, the metadata exchange 10 imports metadata from one or more external sources 90 into the metadata model 15 as a set of model objects. It may also export model objects from the metadata model 15 into one or more external targets 91.

Figure 4:
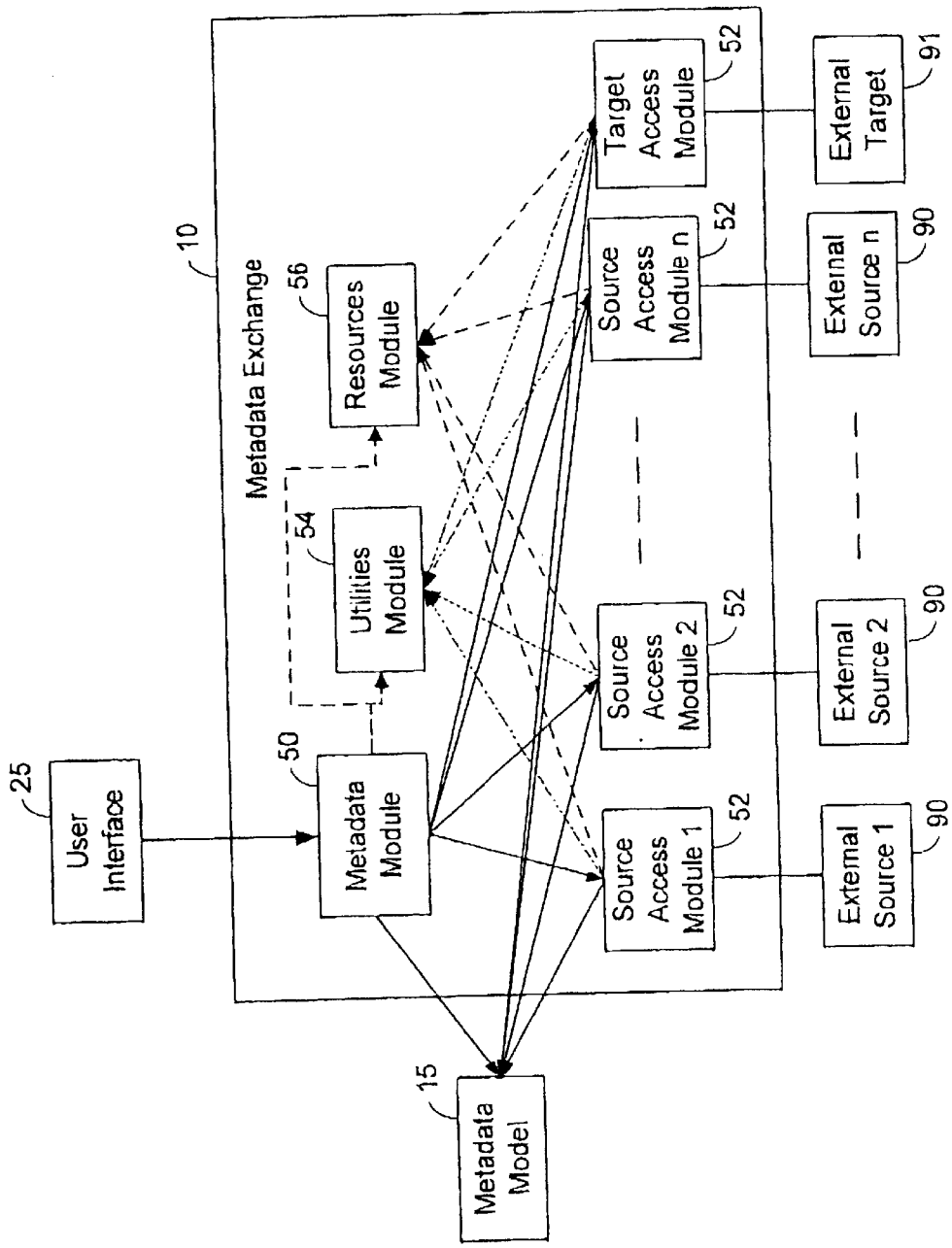
FIG. 4 is a diagram showing an example of the metadata exchange shown in FIG. 1.

FIG. 4 shows an example of the metadata exchange 10 organisation by sub-modules. The metadata exchange 10 comprises a metadata module 50 and one or more source access modules 52. The source access modules 52 communicate directly with various types of external sources 90.

Each external source 90—is able to translate a particular data architecture or source format. For example, an external source 90 may be able to read and translate data from an Impromptu Catalog, an Impromptu Web Query (IWQ) Model, an Informatica's PowerMart or ERwin Model.

Each external source 90 provides metadata in its source format. Metadata in the metadata model 15 is in the model format. Thus, metadata in external sources 90 usually cannot be imported into the metadata model 14 without being translated into the model format.

In order to achieve metadata communication between the metadata exchange 10 and the external sources 90, a source access module 52 is provided for each external source type in the metadata exchange 10. Each source access module 52 is created using the features of the source format used by its corresponding external source 90. The source access modules 52 extract metadata from their corresponding external sources 90. Thus, the extracted metadata is in the source format of the corresponding external source 90.

The metadata module 50 governs the source access modules 52. It is responsible for the dynamical assignment of processing of the metadata depending on the external data source type. The metadata module 50 is also the sub-model where all the persistent objects defined by the metadata exchange are being specified.

The metadata module 50 coordinates loading and calling of each source access module 52. This architecture of metadata exchange 10 allows the user to deal only with the metadata module 50 through the user interface 25 for managing communication with the external sources 90. The user does not communicate with each source access module 52 individually.

The metadata exchange 10 may also have a utilities module 54. The utilities module 54 provides general-purpose utilities shared by all other modules. For example, it may store a function to synchronize model objects so that the metadata exchange 10 does not import a model object if it already exists in the metadata model 15. It may also store code handling the logging of errors, transaction management, expression analysis, etc.

The metadata exchange 10 may also have a resources module 56. The resources module 56 stores resources shared by all the other modules. Examples of shared resources include strings or dialog boxes used to provide feedback to the user via the User Interface.

The metadata exchange 10 may also export metadata from the metadata model 15 to one or more external targets 91.

As described above, the main functionality of the metadata exchange 10 is divided into two levels, i.e., the source access modules 52 that communicates with the external sources 90, and the metadata module 50 which controls the source access modules 52. This two-level architecture allows efficient modification of the metadata exchange 10 to accommodate addition of new external source types dynamically. Thus, it is not necessary to rewrite the entire metadata exchange 10 in order to extend its functionality.

For example, when a new external source type is added, the metadata exchange 10 may be provided with a new source access module 52 which is capable of communicating with the new external source 90. The new source access module 52 is created based on the features of the new external source architecture. Then, the metadata module 50 is modified to govern the new external source 90. The resource access module 56 may be also modified when the new source access module 52 uses resources stored in the resource access module 56. If one of exiting source access modules 52 is capable of communicating with the new external source 90, the new external source 90 may be connected to the source access module 52 and the metadata module 50 is modified accordingly.

In a preferred embodiment, the metadata module 50, source access modules 52, utilities module 54 and resources module 56 are provided as Dynamic Link Libraries (DLLs). For example, a source access DLL 52 contains functions for communicating with its corresponding external source 90, and data extracted from the external source 90. The metadata DLL 50 may load a new source access DLL 52 at runtime.

Figure 5:
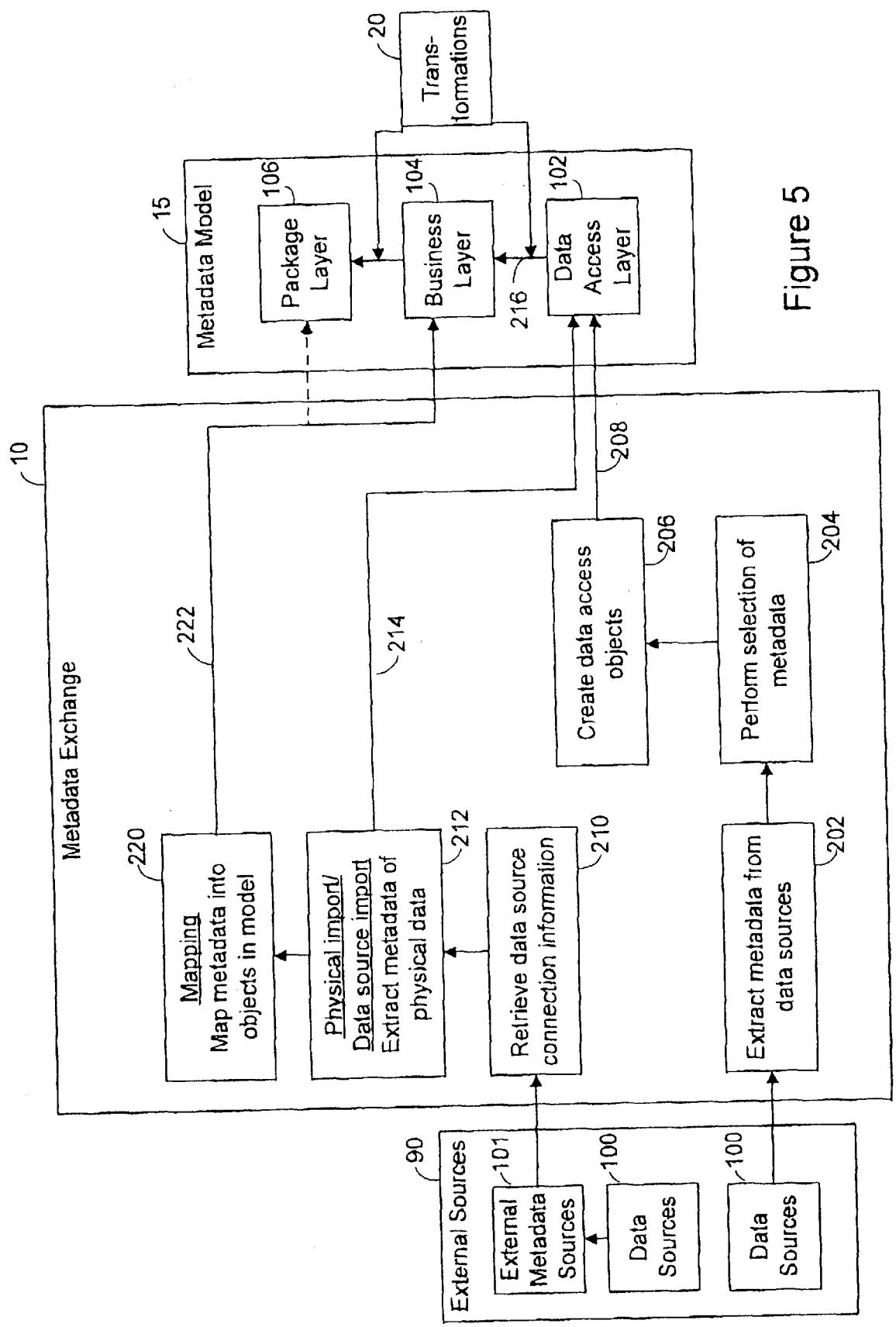
FIG. 5 is a diagram showing an example of dataflow in the metadata exchange.

Referring now to FIGS. 4 and 5, examples of translation of metadata in a source format from external sources into metadata or model objects in a model format are described.

The metadata exchange 10 contains code to exchange or translate the import information of metadata in a source format into model objects in a model format.

External sources 90 may be one or more data sources 100 and/or one or more external metadata sources 101, as described above. Import of metadata from data sources 100 is first described, and then, import of metadata from metadata sources 101 is described.

Referring to FIG. 5, an example of import of metadata from a database 100 is described. The metadata exchange 10 extracts metadata from the database 100 (202). This extraction is carried out by the source access module 52 (FIG. 4) corresponding to the database 100. For example, during database import, the source access module 52 reads tables from the database 100 and determines the organisation of the tables according to a standard, e.g., the ISO 1992 standard. The source access module 52 creates data access model objects based on the extracted metadata (206). The data access model objects are imported into the data access layer 102 of the metadata model 15 (208). The imported data access model objects may be transformed by the transformations 20 to higher-abstraction layers 104, 106 in the transformation process during the importation process.

Prior to the creation of data access model objects (206), the metadata exchange 10 may allow the user to perform selection of metadata (204). Such selection of metadata may be carried out by interacting with the user through the user interface 25 (FIG. 3).

Now, referring to FIGS. 4 and 5, import of metadata from an external metadata source 101 is described. Metadata sources 101 may be further categorized in two types: metadata sources in a format corresponding to other Cognos Inc applications, and metadata sources from third-party sources. When the model format is a format of Cognos Inc., examples of metadata sources in the corresponding format include Impromptu and IWQ. Examples of metadata sources in third-party formats include Informatica, Microsoft (MS) Repository, and ERwin Model.

Metadata sources 101 generally describe or define underlying data sources 100 containing physical data. Each metadata source 101 typically contains metadata referring to its underlying data source 100. Accordingly, the metadata in metadata sources 101 may include information regarding connection to physical data in the underlying databases 100.

When the metadata exchange 10 imports metadata from a metadata source 101, the metadata exchange 10 retrieves information regarding connection to physical data in a data source 100 that is referred to by the metadata source 101 when such information exist (210). This retrieval of the information is carried out by the source access module 52 (FIG. 4) corresponding to the metadata source 101. Using the database connection information, the source access module 52 extracts metadata about physical data from the underlying data source 100 (212). The metadata exchange 10 then imports the extracted metadata into the data access layer 102 of the metadata model 15 as a set of data access model objects 215 (214).

The extraction of metadata (212) may be done without step 210. In this case, the connection information is supplied directly by the user through dedicated user interface interaction.

The metadata exchange 10 may also map the extracted metadata into the business layer 104 of the metadata model 15 as business model objects 222, depending on the extracted metadata (222). The metadata exchange 10 may also map a part of extracted metadata into the package layer 106, depending on the metadata source 101.

Figure 6:
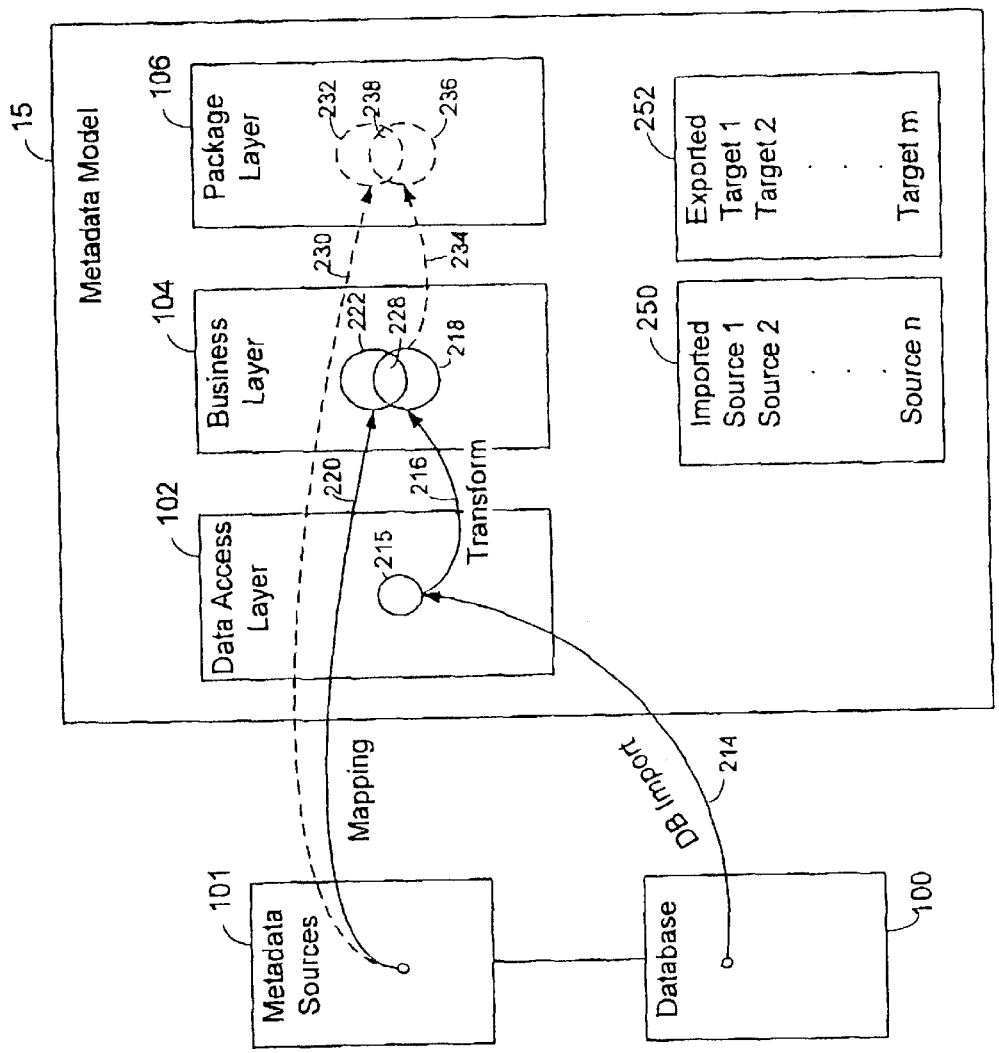
FIG. 6 is a diagram showing an example of intersection carried out by the metadata exchange.

The mapping 220 of the metadata is usually sufficient to create business layer objects. However, as shown in FIG. 6, the metadata exchange 10 may further compare the mapped business model objects 222 with business model objects 218 transformed by the transformations 20 from the data access model objects 215. In this case, the metadata exchange 10 may use the intersection 228 between the mapped objects 222 and the transformed objects 218. Similarly, the metadata exchange 10 may map the metadata into the package layer 106 as a set of package model objects 232, and compare them with objects 236 transformed from the business model objects 218. The use of the intersection between mapped objects and transformed objects may be carried out as a consistency test of the metadata exchange 10.

As shown in FIG. 6, the metadata exchange 10 preferably maintains a list of sources 250 from which metadata is imported into the metadata model 15. It may also maintain in the metadata model 15 a list of export targets 252 to which metadata may be exported from the metadata model 15.

During importation of metadata, it is also possible that the metadata exchange 10 performs synchronization of model objects in the metadata model 15. For example, if a new object is created in the external sources 90, the metadata exchange 10, during a subsequent re-importation, creates a corresponding model object in the metadata model 15. When an object is modified in the external sources 90, in a subsequent re-importation process, the metadata exchange 10 updates its corresponding model object in the metadata model 15. When an object is deleted in the external sources 90, the metadata exchange 10 deletes its corresponding model object in the metadata model 15.

Also, when a model object is modified in the metadata model 15, during any subsequent re-importation from that particular source, the metadata exchange 10 updates its corresponding other model objects in the metadata model 15. When a model object is deleted from the metadata model 15, the model object may be deleted intentionally by the user, or may be deleted inadvertently or only temporarily. In this case, the metadata exchange 10 allows the user to indicate to re-import the deleted object from the external sources 90, or not to re-import the deleted object. By indicating not to import, the user can avoid necessity of deleting unwanted model objects each time the metadata exchange 10 is run for import.

To control the synchronization, it is preferable that the metadata exchange 10 maintains records of model objects that are modified or deleted since the last import.

Figure 7:
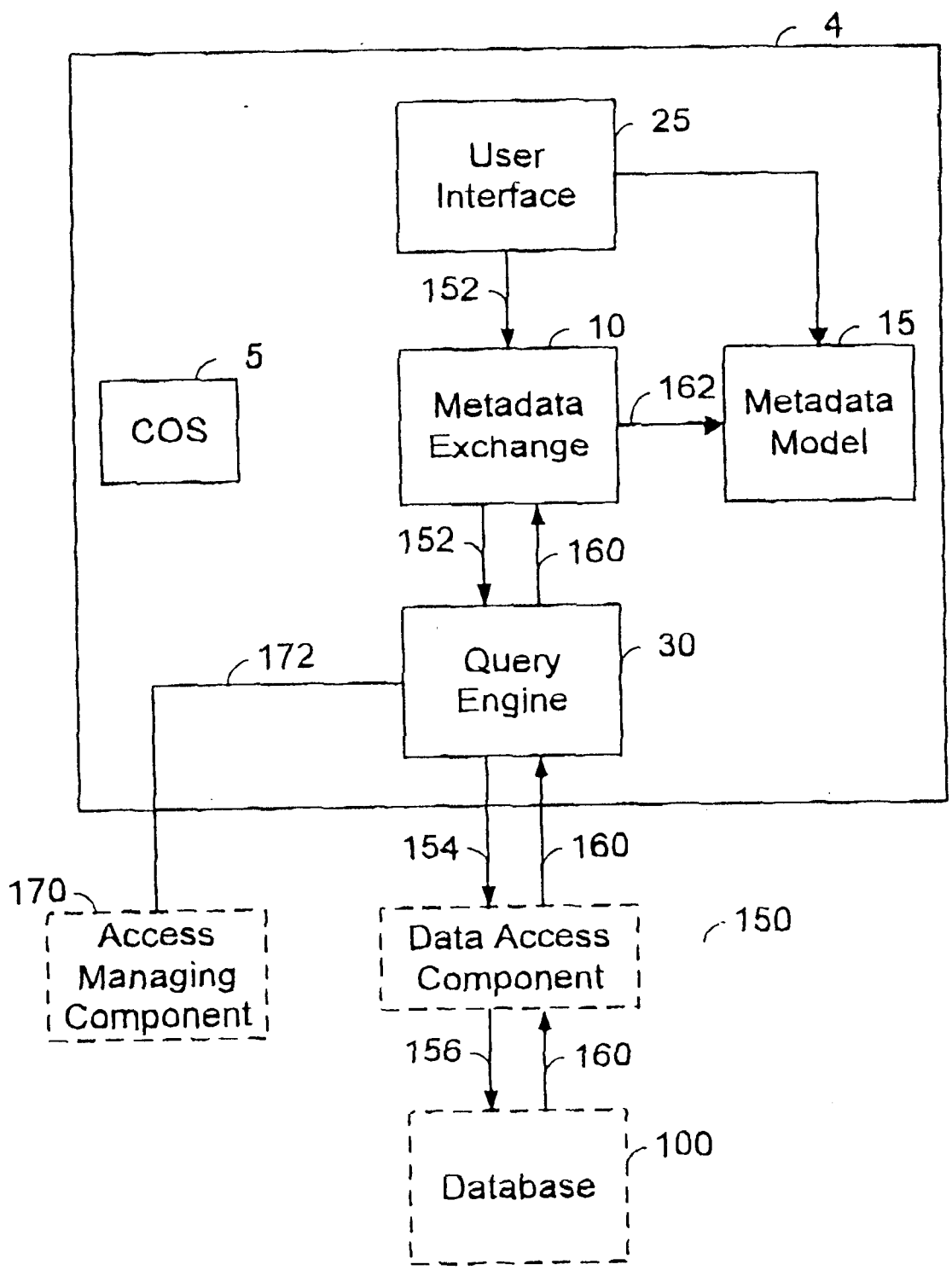
FIG. 7 is a diagram showing an example of metadata import from a database source using the metadata exchange.

The metadata exchange 10 may use series of functional elements to extract metadata from databases 100. FIG. 7 shows an example of actual import of metadata from a database 100.

In order to communicate with a data source 100, it is preferable to use a data access component 150, such as Universal Data Access (UDA) module. The data access component 150 is provided with functions to transparently communicate with the data sources 100. The communication between the metadata exchange module and the UDA model is done through an extra level of indirection provided by the Query Engine 30. The Query Engine 30 passes the import request 152 on as a request 154, which the data access component 150 can pass onto the underlying data source 100. In the case of generic metadata requests, the query engine 30 forwards the request to the data access component 150 using a specific interface. the data access component 150 then translates the request into one or more requests for the data source 100 as requests 956 in the source form that the data source 100 can understand.

In response to the request 156, relevant metadata 160 is obtained from the database 100. The metadata 160 is sent to the metadata exchange 10 through the data access component 150 and the query engine 30 levels. The metadata exchange 10 translates the metadata 160 into model objects 162 in the model format, and sends the model objects 162 to the metadata model 15. Thus, import of the requested metadata into the metadata model 15 from the database 100 is completed.

When the reporting system 4 communicates with any external sources 90 or any other external modules, it is preferable that the reporting system 4 uses a security access managing component 170, such as an Access Manager of Cognos Incorporated which is a central storage of connection information and controls data security.

FIG. 7 also shows the use of such an access managing component 170 when the metadata exchange 10 imports information 160 from the database 100. The query engine 30 communicates with the data access component 150 to obtain information that is required to let the data access component 150 connect to the underlying data source 100.

Example of Mapping

The mapping described above referring to FIGS. 4 and 5 is now described using an example of import of metadata from an ERwin Model to the metadata model 15. The extraction of the metadata is carried out using Erwin objects and their properties as defined in the ERwin model documentation. The object properties include names, type information, description text, relationships, all defined by the ERwin model documentation.

Figure 8:
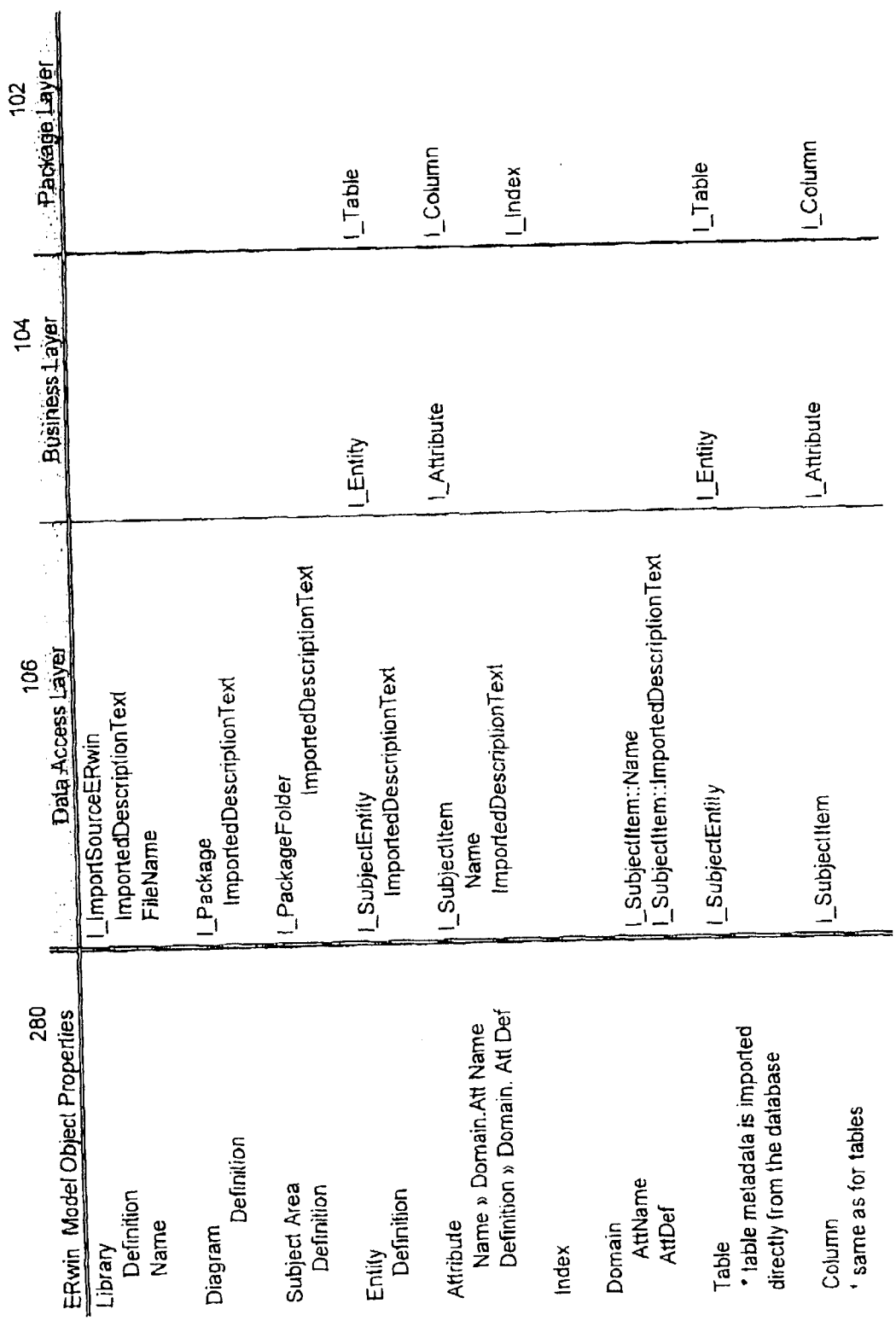
FIG. 8 is a table showing an example of mapping for ERwin Model object properties into model objects.

FIG. 8 shows the mapping between some ERwin Model objects and their properties 280 and model objects in the metadata model 15. In order to achieve an optimal matching, some wrapper in-memory objects around the ERwin objects are created. The ERwin Model object properties 280 are mapped into the data access layer 102, business layer 104 and package layer 106 of the metadata model 15, using a set of mapping rules defined by the ERwin import module. Some of the ERwin Model object properties, such as name, type and precision, are not listed in FIG. 8 but they are also mapped into the metadata model 15 and present in the metadata model 15.

The metadata exchange of the present invention may be implemented by any hardware, software or a combination of hardware and software having the above described functionality. The entire or a part of software code may be stored in a computer readable memory. Also, a computer data signal representing the software code may be transmitted via a communication network. The computer data signal may be embedded in a carrier wave. Such a computer readable memory and a computer data signal are also within the scope of the present invention, as well as the hardware, software and the combination thereof.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A metadata exchange for importing metadata from an external source of metadata which uses a source format into a metadata model which uses a model format, the metadata exchange comprising:

a source access module for communicating with the external source of metadata to extract metadata in the source format, and for creating one or more model objects in the model format based on the extracted metadata to import the created model objects into the metadata model; and a metadata module for controlling the source access module for performing import operation of metadata, the metadata module has a synchronization function for synchronizing the model objects with the external source during the import operation.

2. The metadata exchange as claimed in claim 1, wherein the external source of metadata is a data source containing physical data;

the metadata model has a data access layer for containing data access model objects; and the source access module has a function to create one or more data access model objects in the model format into the data access layer of the metadata model, based on the metadata extracted from the data source.

3. The metadata exchange as claimed in claim 2, wherein the metadata exchange has a selection function to select extracted metadata for which a corresponding data access model object is to be created.

4. The metadata exchange as claimed in claim 1, wherein the source access module includes a mapping function to map metadata extracted from the metadata source into the metadata model to create one or more corresponding model objects.

5. The metadata exchange as claimed in claim 4, wherein the metadata model has a data access layer for containing data access model objects, a business layer for containing business layer objects, and a package layer for containing package model objects; and the mapping function of the source access module maps metadata extracted from the metadata source into the business layer and the package layer of the metadata model depending on the extracted metadata.

6. The metadata exchange as claimed in claim 4, wherein the source access module has an exporting function for exporting model objects to a target metadata source which contains metadata in the model format.

7. The metadata exchange as claimed in claim 1, wherein the external source is a metadata source containing metadata that describes its underlying data source containing physical data, and the metadata contained in the metadata source includes connection information regarding connection to the underlying data source; and the source access module retrieves the connection information from the metadata source, and extracting metadata from the underlying data source to create model objects based on the extracted metadata.

8. The metadata exchange as claimed in claim 7, wherein the source access module has a mapping function to map metadata extracted from the metadata source into the metadata model to create one or more corresponding model objects depending on the extracted metadata.

9. The metadata exchange as claimed in claim 1, wherein the synchronization function updates only objects that are created, changed or deleted since last import operation.

10. The metadata exchange as claimed in claim 9, wherein the synchronization function records changes of the model objects in the metadata model.

11. The metadata exchange as claimed in claim 10 further comprising a resources module for storing resources used by the source access modules.

12. The metadata exchange as claimed in claim 10 further comprising a utilities module for storing functions shared by the multiple source access modules.

13. The metadata exchange as claimed in claim 1, wherein the metadata exchange comprises multiple source access modules, each of which extracts metadata from one or more external sources of metadata.

14. The metadata exchange as claimed in claim 1, wherein the source access module is a source access Dynamic Link Library (DLL).

15. The metadata exchange as claimed in claim 1, wherein the metadata module is a metadata DLL.

16. A method for importing metadata from an external source of metadata which uses a source format into a metadata model which uses a model format, the method comprising steps of:

communicating with the external source of metadata to extract metadata in the source format;

creating one or more model objects in the model format into the metadata mode, based on the extracted metadata; and synchronizing the model objects with the external source during the import operation.

17. The method as claimed in claim 16, wherein the external source of metadata is a data source containing physical data and the metadata model having a data access layer for containing data access model objects; and the communicating step communicates with the data source to extract metadata of the physical data; and the creating step creates one or more data access model objects in the model format into the data access layer of the metadata model, based on the extracted metadata.

18. The method as claimed in claim 17 further comprising a step of selecting extracted metadata for which a corresponding data access model object is to be created.

19. The method as claimed in claim 16, wherein the creating step maps metadata extracted from the metadata source into the metadata model to create one or more corresponding model objects.

20. The method as claimed in claim 19, wherein the metadata model has a data access layer for containing data access model objects, a business layer for containing business layer objects, and a package layer for containing package model objects.

21. The method as claimed in claim 19 further comprising a step of exporting model objects to a target metadata source which contains metadata in the model format.

22. The method as claimed in claim 16, wherein the external source is a metadata source containing metadata that describes its underlying data source containing physical data, and the metadata contained in the metadata source includes connection information regarding connection to the underlying data source; and the communication step including steps of retrieving the connection information from the metadata source, and extracting metadata from the underlying data source to create model objects based on the extracted metadata.

23. The method as claimed in claim 22, wherein the creating step maps metadata extracted from the metadata source into the metadata model to create one or more corresponding model objects depending on the extracted metadata.

24. The method as claimed in claim 16 further comprising the synchronizing step updates only model objects that are created, changed or deleted since last import operation.

25. The method as claimed in claim 24, wherein the synchronization step records changes of the model objects in the metadata model.

26. A reporting system for managing metadata obtained from one or more external sources of metadata, each external source using its source format, the reporting system comprising:

a metadata model for containing model objects, the metadata model using a model format; and a metadata exchange for importing metadata from the external sources of metadata to the metadata model, the metadata exchange having:

multiple source access modules, each source access module for communicating with its corresponding one or more external sources of metadata to extract metadata in the source format, and for creating one or more model objects in the model format based on the extracted metadata to import the created model objects into the metadata model; and a metadata module for controlling the source access modules for performing import operation of metadata, the metadata module having a synchronization function for synchronizing the model objects with the external sources during the import operation.

27. The reporting system as claimed in claim 26, wherein one of the external sources of metadata is a data source containing physical data;

the metadata model has a data access layer for containing data access model objects; and one of the source access modules is connected to the data source, and has a function to create one or more data access model objects in the model format into the data access layer of the metadata model, based on the metadata extracted from the data source.

28. The reporting system as claimed in claim 27, wherein the one of the one of the data access modules has a selection function to select extracted metadata for which a corresponding data access model object is to be created.

29. The reporting system as claimed in claim 26, wherein one of the source access modules is connected to the metadata source, and includes a mapping function to map metadata extracted from the metadata source into the metadata model to create one or more corresponding model objects.

30. The reporting system as claimed in claim 29, wherein the metadata model has a data access layer for containing data access model objects, a business layer for containing business layer objects, and a package layer for containing package model objects; and the mapping function of the one of the source access modules maps metadata extracted from the metadata source into the business layer and the package layer of the metadata model depending on the extracted metadata.

31. The reporting system as claimed in claim 29, wherein the one of the source access modules has an exporting function for exporting model objects to a target metadata source which contains metadata in the model format.

32. The reporting system as claimed in claim 26, wherein one of the external sources is a metadata source containing metadata that describes its underlying data source containing physical data, and the metadata contained in the metadata source includes connection information regarding connection to the underlying data source; and one of the source access modules is connected to the metadata source, retrieves the connection information from the metadata source, and extracting metadata from the underlying data source to create model objects based on the extracted metadata.

33. The reporting system as claimed in claim 32, wherein the one of the source access modules has a mapping function to map metadata extracted from the metadata source into the metadata model to create one or more corresponding model objects depending on the extracted metadata.

34. The reporting system as claimed in claim 26, wherein the synchronization function synchronizes only model objects that are created, changed or deleted since last import operation.

35. The reporting system as claimed in claim 34, wherein the synchronization function records changes of the model objects in the metadata model.

36. The reporting system as claimed in claim 26 further comprising a resources module for storing resources used by the source access modules.

37. The reporting system as claimed in claim 26, further comprising a utilities module for storing functions shared by the multiple source access modules.

38. The reporting system as claimed in claim 26, wherein the source access modules comprise source Dynamic Link Libraries (DLLs).

39. The reporting system as claimed in claim 26, wherein the metadata module comprises a metadata DLL.

40. The reporting system as claimed in claim 26, wherein the metadata exchange further comprises a resources module for storing resources used by the source access module.

41. The reporting system as claimed in claim 26, wherein the metadata exchange further comprises a utilities module for storing functions shared by the sub dynamic link libraries.

42. A computer readable memory having computer executable software code stored thereon, the code including instructions for performing a method for importing metadata from an external source of metadata which uses a source format into a metadata model which uses a model format, and the method comprising steps of:

communicating with the external source of metadata to extract metadata in the source format;

creating one or more model objects in the model format into the metadata mode, based on the extracted metadata; and synchronizing the model objects with the external source during the import operation.

43. A transmittal signal for carrying computer executable instructions for performing a method for importing metadata from an external source of metadata which uses a source format into a metadata model which uses a model format, and the method comprising steps of:

communicating with the external source of metadata to extract metadata in the source format;

creating one or more model objects in the model format into the metadata mode, based on the extracted metadata; and synchronizing the model objects with the external source during the import operation.

* * * * *